Patented June 7, 1949

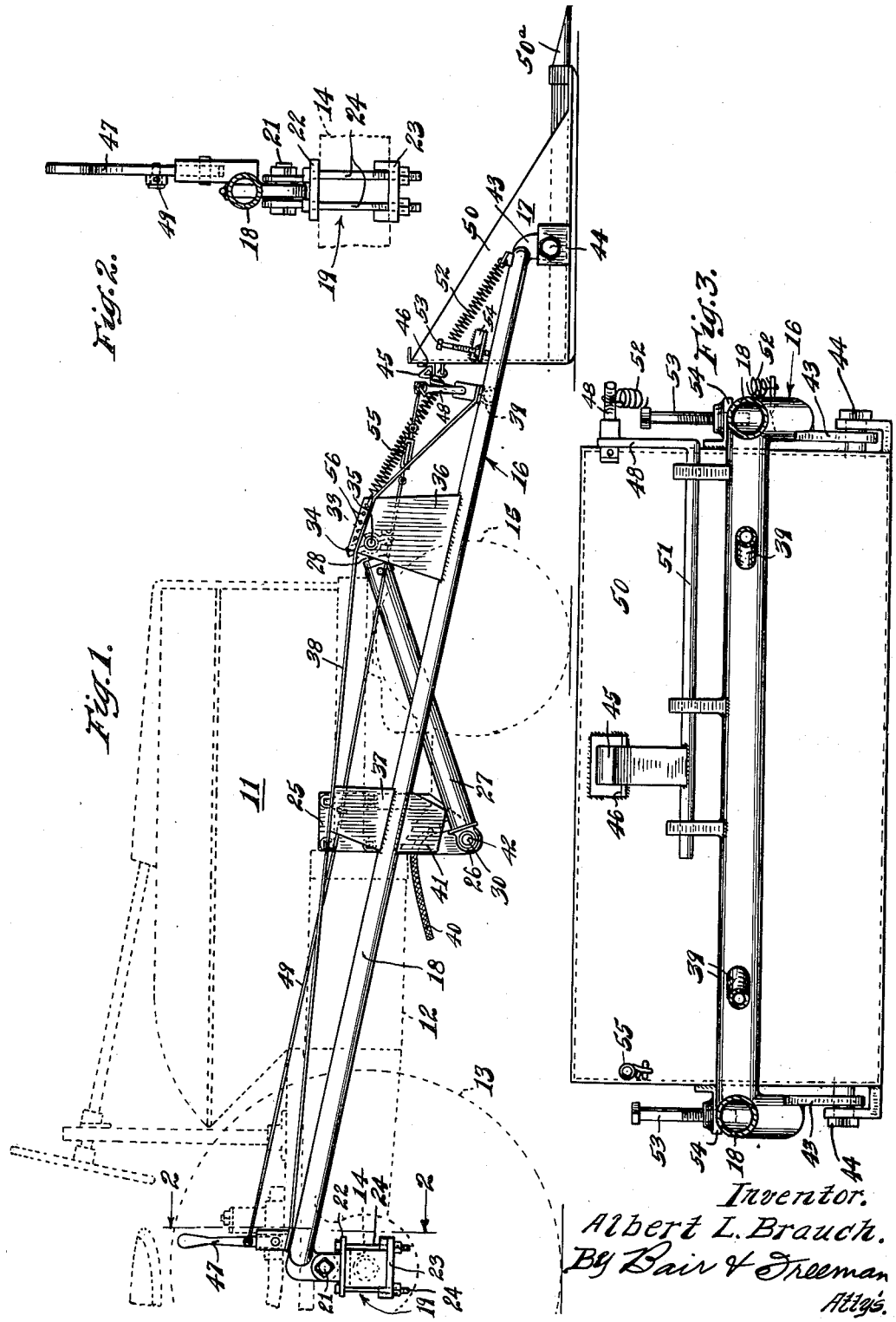

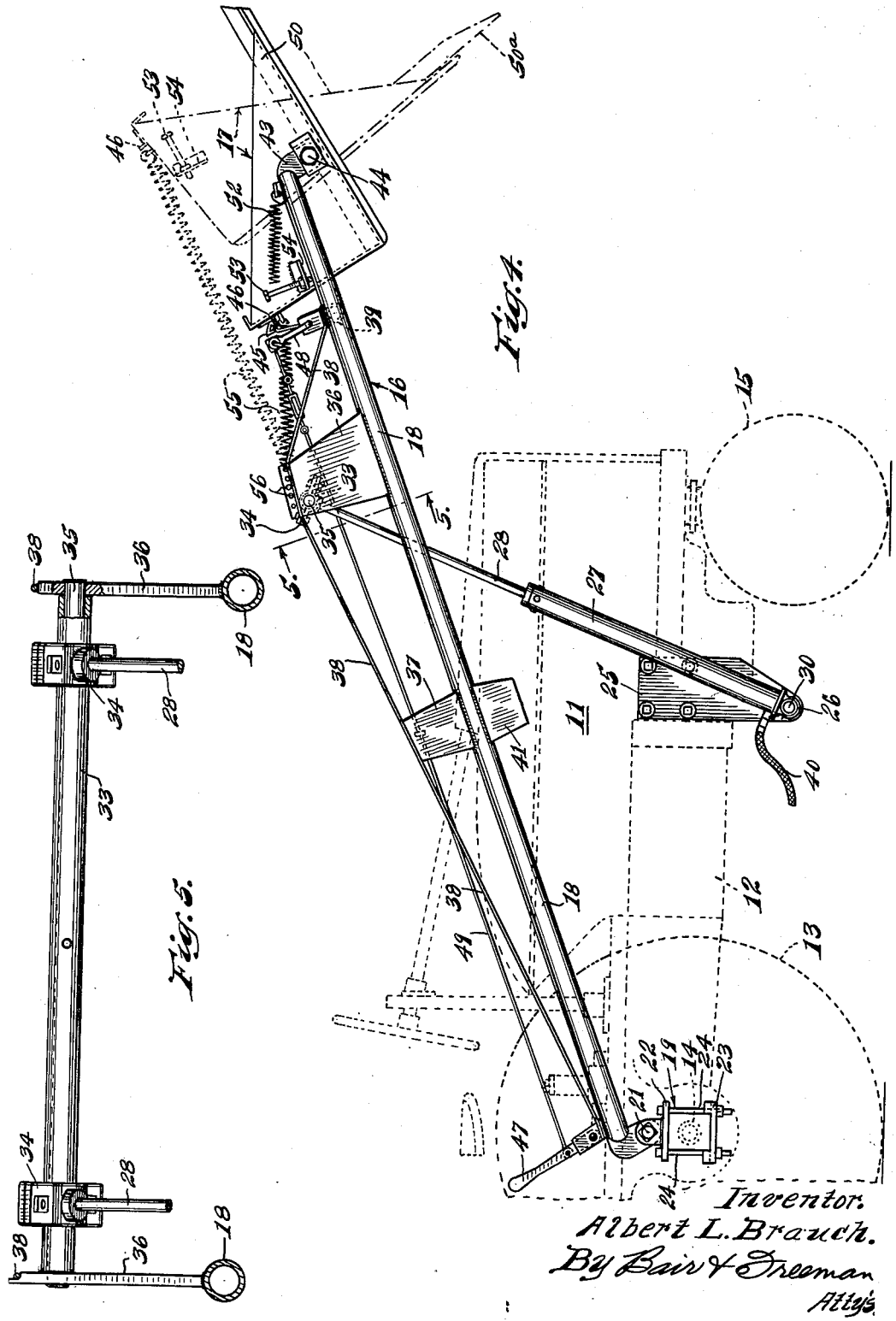

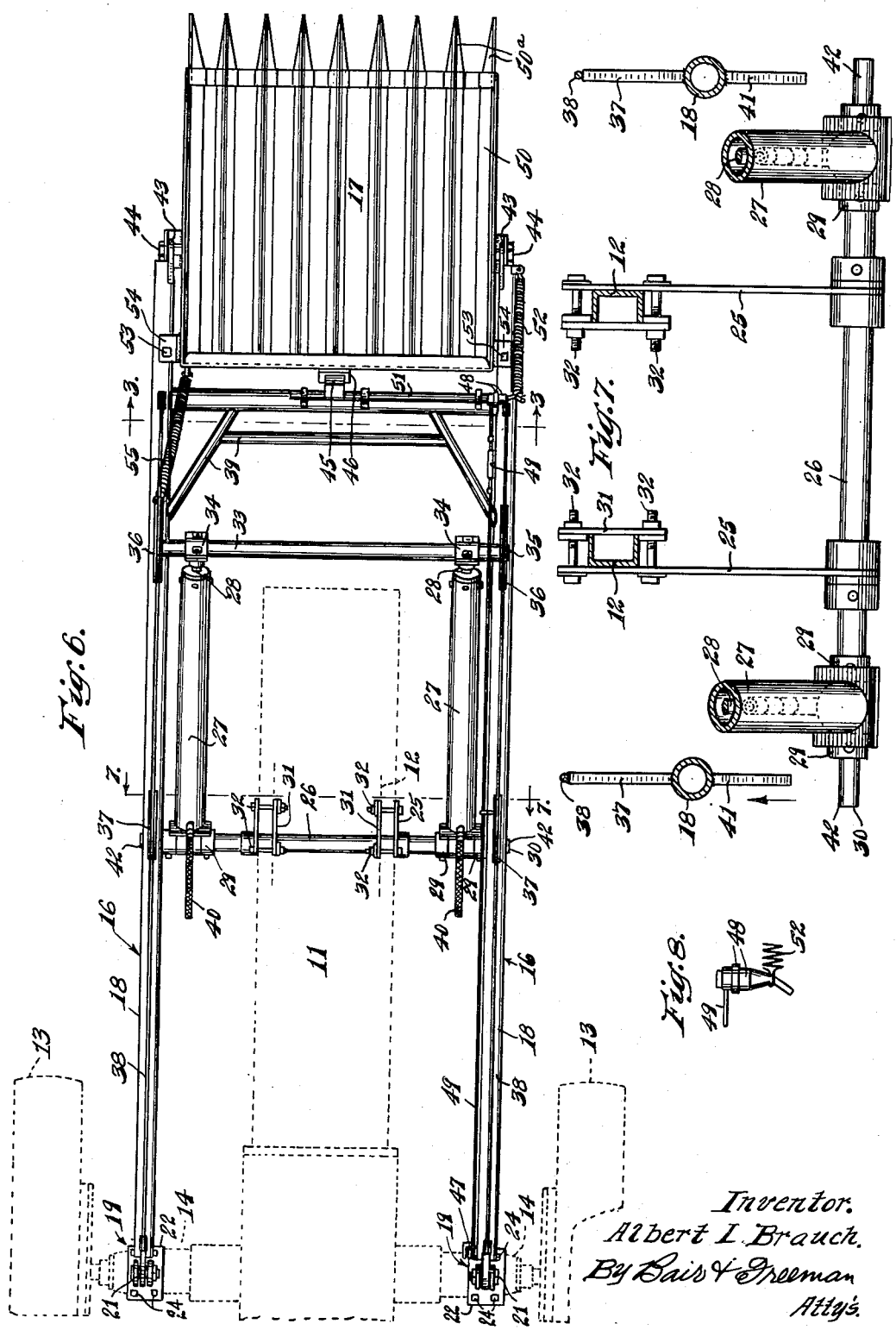

2,472,278

UNITED STATES PATENT OFFICE 2,472,278

ATTACHMENT FOR TRACTORS

Albert L. Brauch, Omaha, Nebr., assignor to Harry A. Smith and Ben E. Kaslow, both of Omaha, Nebr.

Application November 17, 1945, Serial No. 629,214

6 Claims. (Cl. 214—140)

1

This invention relates to an attachment for tractors and particularly to a boom for lifting and loading materials and a loader for attachment to the boom.

Heretofore, such attachments have been provided for tractors and generally comprise a loading and lifting boom to which may be attached one or more implements, such as loaders, shovels or hay racks. The present invention contemplates an improved boom construction and an improved loader for use with the boom, although the invention is not limited to loaders.

It is an object of the invention to improve the boom construction so that it is strong, light in weight and so that side-sway is virtually eliminated.

It is another object of the invention to provide an improved boom structure wherein the operating means for the boom is connected in such a manner that the maximum power may be transmitted to the boom for raising it.

It is still another object of the invention to provide a boom structure wherein the boom is prevented from dropping too far, thus preventing damage to the boom and possible lifting of the front of the tractor by the boom.

It is a further object of the invention to provide an improved adjustment for the angularity of the loader with respect to the boom so that the loader may be positioned in the most advantageous position for loading different materials, such as snow, cobs, grain, manure, etcetera.

It is still a further object of the invention to provide improved loader return mechanism.

It is also an object of the invention to provide an improved return and latch mechanism for the loader.

It is another object of the invention to provide an improved three-point leverage system for the boom and its operating mechanism.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevational view of the improved attachment in its lower position, with portions of the tractor shown in dotted lines;

Figure 2 is a partial sectional view taken on the line 2—2 of Figure 1;

Figure 3 is a partial sectional view taken on line 3—3 of Figure 6;

Figure 4 is a side elevational view of the attachment shown in its raised position, with parts of the tractor shown in dotted lines, and with the loader in its position for dumping shown in dotted lines;

Figure 5 is a sectional view of the attachment taken on line 5—5 of Figure 4;

Figure 6 is a top plan view of the attachment with parts of the tractor shown in dotted lines;

Figure 7 is a sectional view of the attachment taken on line 7—7 of Figure 6, and Figure 8 is an enlarged detail view of a portion of the latch return mechanism.

Referring specifically to the drawings for a detailed description of the invention, numeral 11 designates a conventional tractor having a main frame 12, rear driving wheels 13 and an axle housing 14 for the rear wheels 13. The tractor 11 is also provided with front steering wheels 15 in the usual manner.

A boom, generally indicated by numeral 16 is attached to the tractor 11 and a loader, generally indicated by numeral 17, is attached to the forward end of the boom 16.

The boom is secured to the tractor 11 in the following manner. A pair of straight rigid tubular members 18, which form the main longitudinal structural members of the boom 16, are provided at their rearward extremities with clamping devices 19 pivotally connected at 21 to the tubular members 18. The clamping devices 19 are formed of two plates 22 and 23 which are clamped on opposite sides of the rear axle housing 14 by bolts and nuts 24.

A pair of hydraulic jack supporting plates 25, preferably welded to the tubular members 18 are connected by a tubular member 26 welded to the lower ends of the plates 25. A pair of hydraulic jacks consisting of a cylinder 27 and a piston 28 are secured to a shaft 30 extending through member 26 outside the plates 25 by clamping collars 29, as best shown in Figures 6 and 7. The shaft 30 is free to rotate in the tubular member 26. The upper portions of the plates 25 are provided with clamping members 31 so that bolts 32 may clamp the plates 25 to the tractor frame 12.

The forward ends of the hydraulic jack pistons 28 are secured to a removable tubular member 33 by clamps 34. The tubular member 33 revolves about a shaft 35 welded at its opposite ends to side plates 36 welded to the main frame 18. Reinforcing plates 37 are also welded to the main frame 18 and a reinforcing rod 38 is welded to the rear of the frame 18, to the plates 36 and 37, and then to the forward end of the frame tubular members 18. This construction, together with the A-frame construction 39 between the forward ends of the tubular main frame 18, provides a strong rigid structure and prevents side-sway when under load conditions. Conduits 40 are provided for supplying fluid under pressure to the hydraulic jacks from a suitable pump and reservoir (not shown).

Stop plates 41 are welded to the bottom of the tubular frame 18 and cooperate with extensions 42 on the shaft 30 so that the tubular members 18 are limited in their downward travel, since the extensions 42 strike the plates 41 if the front of the structure drops over a predetermined distance.

A goose-neck member 43 is welded to the forward extremity of each of the main tubular members 18 and provides a pivoted support 44 for the loader 17, including a bucket 40 and teeth 40a. As best shown in the dotted lines in Figure 4, the bucket 40 may swing downwardly to unload when a latch comprising a spring hook 45 and a catch 46 is released by operating a lever 47 pivotally secured to one of the tubular members 18 and connected to a rotatable lever 48 by a cable or rod 49. The lever 48 is attached to the hook 45 by a rod 51 and is biased toward the latching position by a spring 52, parts of which are shown broken away in Figures 1 and 4, for the sake of clarity. An adjustment for positioning the bucket 40 at various angles for loading different materials includes a bolt 53 threaded into a horizontal plate 54 welded on the bucket 4. The bolt 53 extends through the plate 54 in such a position that it strikes the tubular member 18 and thus positions the bucket 40 in its latched position.

A heavy spring 55 is connected to the upper rear wall of the bucket and to one of the side plates 36. The spring tension is adjustable for different materials by placing the rear end thereof in a desired hole 56 on the one plate 36, so that the bucket 40 will swing downwardly when loaded with various materials upon release of the latch and will automatically swing back and latch when the load is dumped by the action of the heavy spring 55. The hook 45 is returned to its latching position automatically by the spring 52 as soon as lever 47 is released.

From the foregoing it will be apparent that I have provided an improved boom and loader construction which is strong, light and made from a minimum number of welded or fabricated parts. Furthermore, the three point leverage system of the hydraulic jacks and tubular members 18 provides for maximum transmission of power from the jacks. The stop plates 41 effectively prevent the pivot points from dropping to or below lower dead center.

I claim as my invention:

1. A hoisting attachment for a tractor comprising a pair of main side frame members, upwardly extending members rigidly secured to the side frame members, means for pivotally securing the rear ends of the frame members to a tractor, actuating means for raising and lowering the main frame members comprising fixed and movable members, means for pivotally securing the fixed members to the tractor, means for pivotally securing the movable members to said upwardly extending members, loading means attached to the forward end of the side frame members, said loading means comprising container means for material to be lifted, means for pivotally attaching said container means to said side frame members, a latch for retaining the container means, in the loading position, a release for said latch and resilient means for returning the container means to the loading position after said latch is released and the container unloaded by the weight of the material therein swinging said container means about its pivot, said resilient means having insufficient strength to prevent pivoting of said container means when it is loaded and being of such strength to return said container means to the loading position when it is unloaded, and a stop associated with the container means and cooperating with one of said side frame members to vary the position of the container means, said stop being adjustable to vary the angularity of the container means to vary its position for loading different materials.

2. A hoisting attachment for a tractor comprising a pair of main side frame members extending substantially horizontally in their loading position, upwardly extending members rigidly secured to the side frame members, means for pivotally securing the rear ends of the frame members to the tractor, actuating means for raising and lowering the main frame members comprising first and second members, said second members being movable relative to said first members, means for pivotally securing the second members to said upwardly extending members, means for pivotally securing the first members to said tractor, the pivot points of the first members being slightly below a line drawn between the other two pivot points when the attachment is in its loading position, and the pivot points of the first member being disposed horizontally between the other two pivot points in all positions, and loading means attached to the forward ends of said frame members.

3. A hoisting attachment for a tractor comprising a pair of main side frame members extending substantially horizontally in their loading position, upwardly extending members rigidly secured to the side frame members, means for pivotally securing the rear ends of the frame members to the tractor, actuating means for raising and lowering the main frame members comprising first and second members, said second members being movable relative to said first members, means for pivotally securing the second members to said upwardly extending members, means for pivotally securing the first members to said tractor, the pivot points of the first members being slightly below a line drawn between the other two pivot points when the attachment is in its loading position, and the pivot points of the first member being disposed horizontally between the other two pivot points in all positions, loading means attached to the forward ends of said frame members, and means for preventing the pivot points of the first members from passing over dead center.

4. A hoisting attachment for a tractor comprising a pair of main side frame members extending substantially horizontally in their loading position, upwardly extending members rigidly secured to the side frame members, means for pivotally securing the rear ends of the frame members to the tractor, actuating means for raising and lowering the main frame members comprising first and second members, said second members being movable relative to said first members, means for pivotally securing the second members to said upwardly extending members, means for pivotally securing the first members to said tractor, the pivot points of the first members being slightly below a line drawn between the other two pivot points when the attachment is in its loading position, and the pivot points of the first member being disposed horizontally between the other two pivot points in all positions, loading means attached to the forward ends of said frame members, and means for preventing the pivot points of the first members from passing over dead center, said last means comprising stop plates secured to the main frame members.

5. A hoisting attachment for a tractor comprising a pair of main side frame members extending substantially horizontally in their loading position, upwardly extending members rigidly secured to the side frame members, means for pivotally securing the rear ends of the frame members to the tractor, actuating means for raising and lowering the main frame members comprising first and second members, said second members being movable relative to said first members, means for pivotally securing the second members to said upwardly extending members, means for pivotally securing the first members to said tractor, the pivot points of the first members being slightly below a line drawn between the other two pivot points when the attachment is in its loading position, and the pivot points of the first member being disposed horizontally between the other two pivot points in all positions, loading means attached to the forward ends of said frame members, said means for pivotally securing the second members to said upwardly extending members comprising a shaft extending between the side frame members, and a tubular member journalled on the shaft with means for securing the movable members to said tubular members.

6. A hoisting attachment for a tractor comprising a pair of main side frame members, upwardly extending members rigidly secured to the side frame members, means for pivotally securing the rear ends of the frame members to the tractor, actuating means for raising and lowering the main frame members comprising fixed and movable members, means for pivotally securing the movable members to said upwardly extending members, means for pivotally securing the pivot points of the fixed members to the tractor, the pivot points of the fixed members being slightly below a line drawn through the other two pivot points when the attachment is in its normal loading position, loading means attached to the forward end of said frame members, means for reinforcing said side frame members comprising a cross brace extending between said frame members at the forward end thereof, a plurality of reinforcing plates secured to the side frame members and a reinforcing member connecting said reinforcing plates longitudinally of the said side frame members.

ALBERT L. BRAUCH.

REFERENCES CITED

The following references are of record in the file of this patent:

UNITED STATES PATENTS

| Number | Name | Date |
| --- | --- | --- |
| 2,019,938 | Stephens | Nov. 5, 1935 |
| 2,242,511 | Cook | May 20, 1941 |
| 2,298,200 | Court | Oct. 6, 1942 |
| 2,301,102 | Werthman et al. | Nov. 3, 1942 |
| 2,304,443 | Butler | Dec. 8, 1942 |
| 2,306,313 | Johnson | Dec. 22, 1942 |
| 2,319,921 | Dooley et al. | May 25, 1943 |
| 2,357,954 | Johnson | Sept. 12, 1944 |
| 2,393,435 | Wachter | Jan. 22, 1946 |
| 2,397,303 | Vowless | Mar. 26, 1946 |
| 2,398,119 | Sauder | Apr. 9, 1946 |
| 2,402,064 | Market | June 11, 1946 |
| 2,433,086 | Borgelt | Dec. 23, 1947 |